United States Patent
Xie (10) Patent No.: US 9,571,206 B2
(45) Date of Patent: Feb. 14, 2017

(54) SYMBOL TIMING AND CLOCK RECOVERY FOR VARIABLE-BANDWIDTH OPTICAL SIGNALS

(71) Applicant: Alcatel-Lucent USA Inc., Murray Hill, NJ (US)

(72) Inventor: Chongjin Xie, Morganville, NJ (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 0 days.

(21) Appl. No.: 14/500,239

(22) Filed: Sep. 29, 2014

(65) Prior Publication Data

US 2016/0094297 A1    Mar. 31, 2016

(51) Int. Cl.
H04B 10/00    (2013.01)
H04B 10/61    (2013.01)

(52) U.S. Cl.
CPC .................................. H04B 10/616 (2013.01)

(58) Field of Classification Search
None
See application file for complete search history.

(56) References Cited

U.S. PATENT DOCUMENTS

| | | | |
|---|---|---|---|
| 5,463,716 A * | 10/1995 | Taguchi | G10L 19/0204 704/205 |
| 6,683,855 B1 | 1/2004 | Bordogna et al. | |
| 7,212,741 B2 | 5/2007 | Myong et al. | |
| 7,266,310 B1 | 9/2007 | Savory et al. | |
| 7,424,651 B2 | 9/2008 | Domagala et al. | |
| 7,574,146 B2 | 8/2009 | Chiang et al. | |
| 7,636,525 B1 | 12/2009 | Bontu et al. | |
| 7,734,191 B1 | 6/2010 | Welch et al. | |
| 7,747,177 B2 | 6/2010 | Chen et al. | |
| 7,809,284 B2 | 10/2010 | Kaneda et al. | |
| 8,260,154 B2 | 9/2012 | Chang et al. | |
| 8,275,224 B2 | 9/2012 | Doerr | |
| 2006/0285854 A1 * | 12/2006 | Sun | H03L 7/085 398/155 |

(Continued)

OTHER PUBLICATIONS

Barton, S. K., et al., "A Symbol Timing Recovery Scheme Based on Spectral Redundancy," IEE Colloquium on Advanced Modulation and Coding Techniques for Satellite Communications, Jan. 27, 1992, pp. 3/1-3/6.

(Continued)

*Primary Examiner* — Ken N Vanderpuye
*Assistant Examiner* — David Lambert
(74) *Attorney, Agent, or Firm* — Mendelsohn Dunleavy, P.C.; Steve Mendelsohn (57) ABSTRACT

We disclose an optical receiver having a configurable clock-recovery module, an operative configuration of which is selectable based on a bandwidth of the optical input signal. In an example embodiment, the clock-recovery module adopts a first configuration for non-Nyquist optical input signals, and adopts a different second configuration for Nyquist and faster-than-Nyquist optical input signals. The configurability of the clock-recovery module may advantageously prevent the clock-recovery algorithm from breaking down, e.g., due to variability of the bandwidth of the optical input signal caused by the variability of the routes that optical signals may take in the corresponding optical-transport network before arriving at the optical receiver.

14 Claims, 7 Drawing Sheets

(56) References Cited

U.S. PATENT DOCUMENTS

| | | | |
|---|---|---|---|
| 2008/0152361 A1 | 6/2008 | Chen et al. | |
| 2008/0205884 A1* | 8/2008 | Maestle | H01S 5/0014 398/16 |
| 2010/0054759 A1* | 3/2010 | Oda | H04B 10/6971 398/202 |
| 2010/0329677 A1* | 12/2010 | Kaneda | H04B 10/60 398/65 |
| 2012/0057863 A1 | 3/2012 | Winzer et al. | |
| 2013/0071124 A1 | 3/2013 | Xie et al. | |
| 2013/0108276 A1* | 5/2013 | Kikuchi | H04B 10/677 398/158 |
| 2013/0209089 A1* | 8/2013 | Harley | H04B 10/5561 398/25 |
| 2013/0230312 A1 | 9/2013 | Randel et al. | |
| 2014/0086594 A1 | 3/2014 | Xie et al. | |

OTHER PUBLICATIONS

Stojanovic, Nebojša, et al., "Feed-Forward and Feedback Timing Recovery for Nyquist and Faster than Nyquist Systems," Optical Fiber Communications Conference and Exhibition (OFC), San Francisco, 2014, pp. 1-3.

Xie, Chongjin, et al., "Colorless coherent receiver using 3x3 coupler hybrids and single-ended detection," Optics Express, 2012, vol. 20, No. 2, pp. 1164-1171.

Yan, Meng et al., "Digital Clock Recovery Algorithm for Nyquist Signal," Optical Fiber Communication Conference and Exposition and the National Fiber Optic Engineers Conference (OFC/NFOEC), 2013, pp. 1-3.

Nikolajew, Adam. "Effect of dispersion on bandwidth of single mode optical fiber" Przeglqd Elektrotechniczny 88, No. 10b (2012): 324-325.

\* cited by examiner

SYMBOL TIMING AND CLOCK RECOVERY FOR VARIABLE-BANDWIDTH OPTICAL SIGNALS

BACKGROUND

Field

The present disclosure relates to optical communication equipment and, more specifically but not exclusively, to symbol timing and clock recovery for variable-bandwidth optical signals.

Description of the Related Art

This section introduces aspects that may help facilitate a better understanding of the disclosure. Accordingly, the statements of this section are to be read in this light and are not to be understood as admissions about what is in the prior art or what is not in the prior art.

Clock recovery is performed at an optical receiver to maintain synchronization between the digital signal processing performed at the receiver and the internal clock of the received signal. The Gardner method of clock recovery is widely used in optical receivers due to its simplicity and independence of the carrier phase. In a representative implementation, the Gardner method relies on the presence of a clock tone in the timing-error signal generated to determine the sign and magnitude of the clock adjustment that is needed to maintain the synchronization. A clock tone is typically located at a frequency that is offset by 1/T from the carrier frequency, where T is the symbol period. The timing-error signal corresponding to an optical communications signal may have two such clock tones, one on each side of the carrier. However, for optical signals having a bandwidth that is close to or narrower than 1/T, the clock tones in the timing-error signal tend to be greatly attenuated, which disadvantageously degrades the performance of the Gardner method.

SUMMARY OF SOME SPECIFIC EMBODIMENTS

Disclosed herein are various embodiments of an optical receiver having a configurable clock-recovery module, an operative configuration of which is selectable based on a bandwidth of the optical input signal. In an example embodiment, the clock-recovery module adopts a first configuration for non-Nyquist optical input signals, and adopts a different second configuration for Nyquist and faster-than-Nyquist optical input signals. The configurability of the clock-recovery module may advantageously prevent the clock-recovery algorithm from breaking down, e.g., due to variability of the bandwidth of the optical input signal caused by the variability of the routes that optical signals may take in the corresponding optical-transport network before arriving at the optical receiver.

According to one embodiment, provided is an apparatus comprising: an optical-to-electrical converter configured to mix an optical input signal with an optical reference signal to generate a plurality of electrical digital measures of the optical input signal; and a digital circuit configured to process the plurality of electrical digital measures to recover data encoded in the optical input signal. The digital circuit comprises a configurable clock-recovery module, an operative configuration of which is selectable, based on a bandwidth of the optical input signal, from a first configuration and a second configuration. The digital circuit is configured to recover the data using a clock signal generated by the clock-recovery module in the operative configuration.

According to another embodiment, provided is a method of processing an optical input signal, the method comprising the steps of: (A) optically mixing the optical input signal with an optical reference signal to generate a plurality of electrical digital measures of the optical input signal; (B) estimating a bandwidth of the optical input signal by determining a bandwidth of an electrical digital signal generated by digitally processing the plurality of electrical digital measures; (C) generating a clock signal using a configurable clock-recovery module, an operative configuration of which is selectable, based on the bandwidth of the optical input signal, from a first configuration and a second configuration; and (D) recovering data encoded in the optical input signal using the clock signal generated by the clock-recovery module in the operative configuration.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

As used herein, the term "Nyquist signal" refers to an optical signal carrying 1/T symbols per second and having a bandwidth equal to 1/T Hz. The term "faster-than-Nyquist signal" refers to an optical signal carrying 1/T symbols per second and having a bandwidth smaller than 1/T Hz. The term "non-Nyquist signal" refers to an optical signal carrying 1/T symbols per second and having a bandwidth greater than 1/T Hz.

Faster-than-Nyquist signals may be generated by an optical transmitter configured to use a corresponding appropriate modulation format. For example, an optical quadrature duobinary signal is a faster-than-Nyquist signal. Nyquist and faster-than-Nyquist signals may also be generated when the corresponding non-Nyquist signals are subjected to narrow band-pass filtering, e.g., in reconfigurable optical add-drop multiplexers, between the originating optical transmitters and the intended optical receivers. Depending on the routes that the received optical signals take before arriving at the intended optical receiver, some of the received optical signals may be non-Nyquist signals, and some other received optical signals may be Nyquist or faster-than-Nyquist signals even when the originating optical transmitters are configured to generate exclusively non-Nyquist signals.

As already indicated above, the widely used Gardner method of clock recovery may disadvantageously break down for Nyquist or faster-than-Nyquist signals. There is therefore a pressing need for clock-recovery methods and circuits that can operate well for both non-Nyquist signals and Nyquist and faster-than-Nyquist signals. Various embodiments disclosed herein in reference to FIGS. 1-6 are directed at addressing this pressing need.

Figure 1:
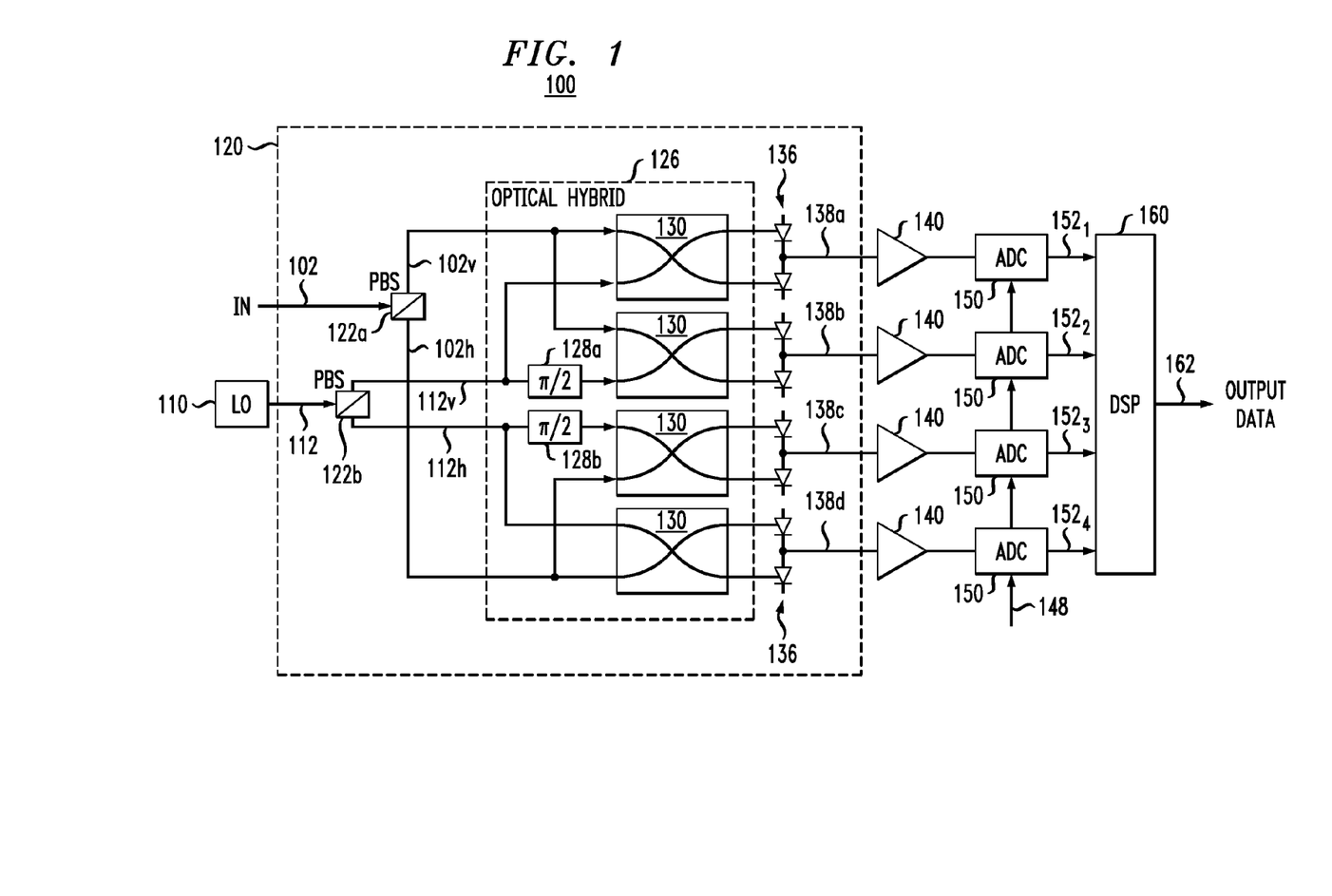
FIG. 1 shows a block diagram of an optical receiver according to an embodiment of the disclosure.

FIG. 1 shows a block diagram of a coherent optical receiver 100 according to one embodiment of the disclosure. Receiver 100 is configured to receive a polarization-multiplexed modulated optical signal 102, e.g., from a remote transmitter, via an external optical communication link (not explicitly shown in FIG. 1). Optical signal 102 is applied to an optical-to-electrical (O/E) converter 120 that converts that optical signal into four electrical signals 138a-138d. Each of signals 138a-138d may optionally be amplified in a corresponding amplifier 140 coupled to a corresponding analog-to-digital converter (ADC) 150. Each ADC 150 samples the output of a corresponding amplifier 140 at an appropriate sampling frequency and sampling phase(s) set by a control signal 148 to produce a corresponding one of four digital signals 152a-152d. Digital signals 152a-152d are applied to a digital signal processor (DSP) 160 that processes them, e.g., as described in more detail below in reference to FIGS. 2-6, to recover the data streams originally encoded onto the two polarization components of optical signal 102 at the remote transmitter. DSP 160 outputs the recovered data via an output data signal 162.

In an example embodiment, receiver 100 may also include a set of electrical low-pass filters (not explicitly shown in FIG. 1), each inserted between O/E converter 120 and the respective one of ADCs 150. The use of these filters may help to reduce noise and prevent aliasing.

Control signal 148 is typically used to configure ADCs 150 to sample their respective input signals at a sampling rate that causes each ADC to generate two signal samples per symbol period T. In some embodiments, control signal 148 may have a frequency that is two times higher than the nominal symbol rate of optical signal 102, but otherwise is not synchronized with the internal clock of the optical signal. In some other embodiments, control signal 148 may be generated using a clock-recovery module of DSP 160, e.g., as described in more detail below in reference to FIGS. 4 and 5.

O/E converter 120 implements a polarization-diversity homodyne- or intradyne-detection scheme using an optical local-oscillator (LO) signal 112 generated by a laser source 110. In one embodiment, O/E converter 120 is an integrated planar waveguide circuit. Polarization beam splitters (PBSs) 122a and 122b in O/E converter 120 operate to decompose signals 102 and 112, respectively, into two respective orthogonally polarized components, illustratively vertically polarized components 102v and 112v and horizontally polarized components 102h and 112h. These polarization components are then directed to an optical hybrid 126.

In optical hybrid 126, each of polarization components 102v, 112v, 102h, and 112h is split into two (attenuated) copies, e.g., using a conventional 3-dB power splitter (not explicitly shown in FIG. 1). A relative phase shift of about 90 degrees ($\pi/2$ radian) is then applied to one copy of component 112v and one copy of component 112h using phase shifters 128a and 128b, respectively. The various copies of signals 102v, 112v, 102h, and 112h are optically mixed with each other as shown in FIG. 1 using four optical signal mixers 130, and the mixed signals produced by the mixers are detected by eight photo-detectors (e.g., photo-diodes) 136. Photo-detectors 136 are arranged in pairs, e.g., as shown in FIG. 1, and the output of each photo-detector pair, e.g. balanced detector pair, is a corresponding one of electrical signals 138a-138d. This configuration of photo-detectors 136 is a differential configuration that helps to reduce noise and improve DC balancing.

In an alternative embodiment, O/E converter 120 can have four photo-detectors 136, one per optical signal mixer 130, configured for single-ended detection of the corresponding optical signals. In yet another alternative embodiment, optical hybrid 126 may be replaced by a 3×3 optical coupler having three photodiodes per polarization at its output, e.g., described in (i) U.S. Patent Application Publication No. 2013/0071124 and (ii) a paper by Chongjin Xie, Peter J. Winzer, Gregory Raybon, et al. "Colorless Coherent Receiver Using 3×3 Coupler Hybrids and Single-Ended Detection," OPTICS EXPRESS, 2012, Vol. 20, No. 2, pp. 1164-1171, both of which are incorporated herein by reference in their entirety.

Example optical hybrids that are suitable for use in optical receiver 100 are described, e.g., in commonly owned U.S. Pat. Nos. 7,809,284 and 8,275,224, both of which are incorporated herein by reference in their entirety.

In an example embodiment, DSP 160 performs (i) signal equalization, (ii) clock recovery, and (iii) carrier- and data-recovery (CDR) processing. Signal equalization is generally directed at reducing the detrimental effects of various signal impairments imparted onto optical signal 102 in the optical-transport link. Such signal impairments might include, but are not limited to polarization distortion (PD), chromatic dispersion (CD), polarization-mode dispersion (PMD), additive noise, and other linear and nonlinear forms of signal distortion. One of ordinary skill in the art will appreciate that these signal impairments might accrue in the optical-transport link through either localized or distributed mechanisms, or through a combination of both types of mechanisms. Clock recovery is generally directed at synchronizing the digital signal processing performed in DSP 160 with the internal clock of optical signal 102. The CDR processing is generally directed at recovering the transmitted data with a relatively low bit-error rate (BER).

Figure 2:
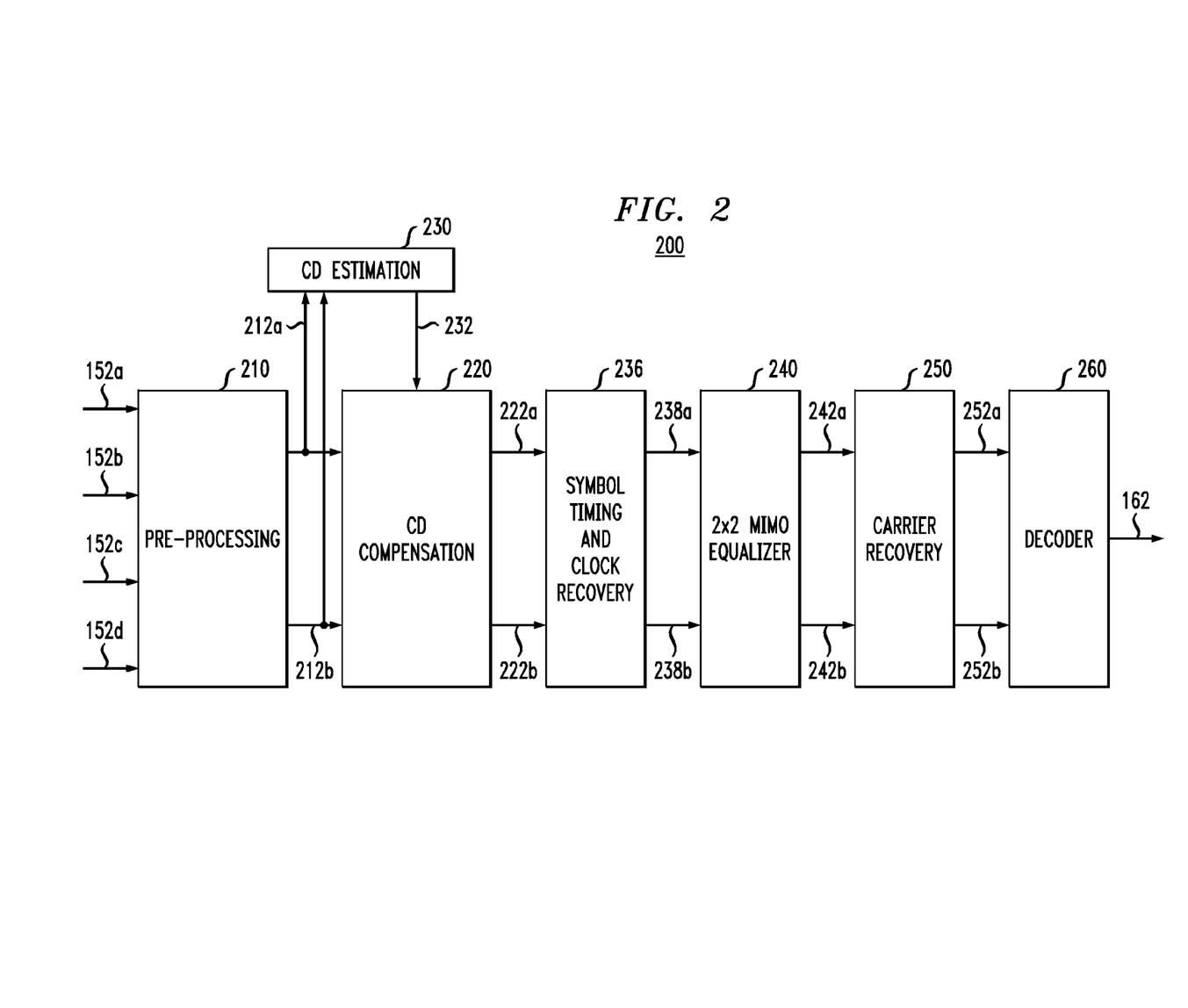
FIG. 2 shows a block diagram of a digital circuit that can be used in the optical receiver of FIG. 1 according to an embodiment of the disclosure.

FIG. 2 shows a block diagram of a digital circuit 200 that can be used in DSP 160 (FIG. 1) according to an embodiment of the disclosure. Digital circuit 200 is illustratively shown in FIG. 2 as being configured to (i) receive digital signals 152a-152d and (ii) generate output data signal 162 (also see FIG. 1). Alternative configurations of digital circuit 200 are also contemplated.

Ideally, digital signals 152a and 152b represent the I and Q components, respectively, of the first polarization component (e.g., X) of optical signal 102, and digital signals 152c and 152d represent the I and Q components, respectively, of the second polarization component (e.g., Y) of that optical signal. However, optical-link impairments, receiver-implementation imperfections, and configuration inaccuracies generally cause each of digital signals 152a-152d to be a convoluted signal that has various signal distortions and/or contributions from both of the original polarization components generated at the remote optical transmitter. The train of signal processing implemented in digital circuit 200 is generally directed at reducing the adverse effects of various signal distortions and de-convolving digital signals 152a-152d so that the transmitted data can be properly recovered to generate output data signal 162.

Digital circuit 200 has a signal-pre-processing module 210 configured to receive digital signals 152a-152d. One function of module 210 may be to adapt the signal samples received via digital signals 152a-152d to a form more suitable for the signal-processing algorithms implemented in the downstream modules of digital circuit 200. For example, module 210 may be configured to convert the real-valued signal samples received via digital signals 152a-152d into the corresponding complex-valued signal samples that are then directed downstream, along the signal processing pipeline of digital circuit 200, via digital signals 212a and 212b.

In one embodiment, module 210 may also be configured to reduce signal distortions imposed by the front-end of optical receiver 100 (see FIG. 1). These distortions may be caused, e.g., by incorrect biasing of various electro-optical components in O/E converter 120, imperfect signal splitting in power and polarization splitters and optical couplers, frequency dependence and variability of the O/E conversion characteristics of the photo-detectors, deskews among the four ADCs 150 (FIG. 1), etc. Representative signal-processing methods that can be implemented in module 210 for this purpose are disclosed, e.g., in commonly owned U.S. Patent Application Publication No. 2012/0057863, which is incorporated herein by reference in its entirety.

Complex-valued digital signals 212a and 212b are applied to a CD compensation (CDC) module 220 for CDC processing therein, and the resulting CDC-processed signals are complex-valued digital signals 222a and 222b. A CDC controller 230 serves to generate a control signal 232 that appropriately configures various configurable elements within CDC module 220 to significantly reduce or substantially cancel the detrimental effects of chromatic dispersion caused by the optical transport link configured to feed optical signal 102 into optical receiver 100. In an example embodiment, CDC controller 230 may generate control signal 232 by estimating, based on digital signals 212a and 212b, the group delay in the optical transport link and then determining a configuration of CDC module 220 that compensates the estimated group delay. Example signal-processing methods that can be adapted for generating control signal 232 in digital circuit 200 are disclosed, e.g., in U.S. Pat. Nos. 8,260,154, 7,636,525, 7,266,310, all of which are incorporated herein by reference in their entirety.

Digital signals 222a and 222b generated by CDC module 220 are applied to a clock-recovery module 236. The signal processing implemented in clock-recovery module 236 causes digital signals 238a and 238b outputted by the clock-recovery module to be properly sampled for the subsequent processing in the downstream modules of digital circuit 200. Example embodiments of clock-recovery module 236 are described in more detail below in reference to FIG. 3.

Digital signals 238a and 238b outputted by clock-recovery module 236 are applied to a 2×2 MIMO (multiple-input/multiple-output) equalizer 240 for MIMO-equalization processing therein, and the resulting equalized signals are complex-valued digital signals 242a and 242b. In one embodiment, equalizer 240 can be a butterfly equalizer configured to perform (i) polarization de-multiplexing and (ii) signal processing directed at further reducing the adverse effects of certain signal impairments, such as polarization-mode dispersion (PMD), polarization-dependent loss (PDL), inter-symbol interference (ISI), and residual CD. An example embodiment of equalizer 240 is disclosed, e.g., in U.S. Patent Application Publication No. 2014/0086594, which is incorporated herein by reference in its entirety.

Digital signals 242a and 242b generated by MIMO equalizer 240 are applied to a carrier-recovery module 250. Together with a signal decoder 260, carrier-recovery module 250 carries out the above-mentioned CDR processing, which is generally directed at compensating the frequency mismatch between the carrier frequencies of LO signal 112 and optical signal 102, reducing the effects of phase noise, and recovering the transmitted data. Various signal-processing techniques that can be used to implement the frequency-mismatch compensation are disclosed, e.g., in U.S. Pat. No. 7,747,177 and U.S. Patent Application Publication No. 2008/0152361, both of which are incorporated herein by reference in their entirety. Representative signal-processing techniques that can be used to implement phase-error correction are disclosed, e.g., in U.S. Patent Application Publication No. 2013/0230312, which is incorporated herein by reference in its entirety.

Digital signals 252a and 252b generated by carrier-recovery module 250 are applied to decoder 260. Decoder 260 is configured to use the complex values conveyed by digital signals 252a and 252b to appropriately map each received symbol onto an operative constellation and, based on said mapping, recover the corresponding data. Decoder 260 then appropriately multiplexes the data recovered from digital signals 252a and 252b, respectively, to generate output data signal 162.

In some embodiments, decoder 260 may perform digital signal processing that implements error correction based on data redundancies (if any) in optical signal 102. Many FEC methods suitable for this purpose are known in the art. Several suitable methods are disclosed, e.g., in U.S. Pat. Nos. 7,734,191, 7,574,146, 7,424,651, 7,212,741, and 6,683,855, all of which are incorporated herein by reference in their entirety.

Figure 3:
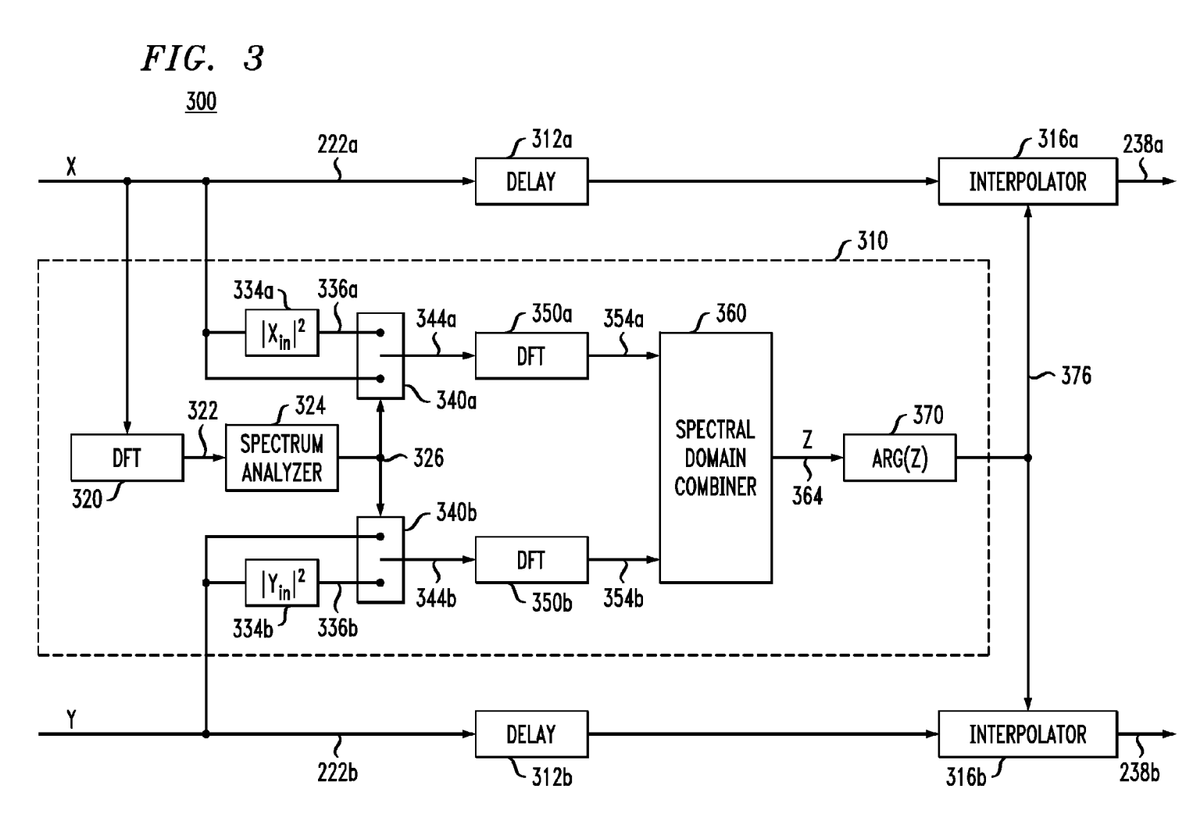
FIG. 3 shows a block diagram of a clock-recovery module that can be used in the digital circuit of FIG. 2 according to an embodiment of the disclosure.

FIG. 3 shows a block diagram of a digital circuit 300 that can be used as clock-recovery module 236 (FIG. 2) according to an embodiment of the disclosure. Digital circuit 300 is illustratively shown in FIG. 3 as being configured to (i) receive digital signals 222a and 222b and (ii) output data signals 238a and 238b (also see FIG. 2). Alternative configurations of digital circuit 300 are also contemplated.

Digital circuit 300 includes a phase detector 310 coupled between its X and Y signal-processing branches as indicated in FIG. 3. The X signal-processing branch of digital circuit 300 includes a delay element 312a and an interpolator 316a. The Y signal-processing branch of digital circuit 300 similarly includes a delay element 312b and an interpolator 316b. Each of delay elements 312a and 312b is configured to introduce a time delay that is approximately the same as the signal-processing time in phase detector 310. Interpolator 316a is configured to (i) interpolate digital signal 222a after it has been delayed by delay element 312a and (ii) resample the resulting interpolated digital signal at the phases that are determined based on a phase-error signal 376 generated by phase detector 310 to generate digital signal 238a. Interpolator 316b is similarly configured to (i) interpolate digital signal 222b after it has been delayed by delay element 312b and (ii) resample the resulting interpolated digital signal at the phases determined based on phase-error signal 376 to generate digital signal 238b.

Phase detector 310 includes a discrete Fourier-transform (DFT) module 320 and a spectrum analyzer 324 that are configured to determine whether optical signal 102 (FIG. 1), from which digital signals 222a and 222b have been derived, is a non-Nyquist signal or Nyquist/faster-than-Nyquist signal. To enable this determination, DFT module 320 operates to apply a Fourier transform to a sequence of digital samples carried by digital signal 222a to generate a corresponding plurality of spectral samples 322. Spectrum analyzer 324 then operates to (i) determine a spectral width of the spectral envelope defined by spectral samples 322; (ii) compare the determined spectral width with an appropriate predetermined threshold value; and (iii) based on this comparison, generate a switch-control signal 326. In an example embodiment, switch-control signal 326 is a binary signal that has (i) a first binary value, e.g., a binary zero, when the spectral width is greater than the threshold value, which indicates that optical signal 102 is a non-Nyquist signal; and (ii) a second binary value, e.g., a binary one, when the spectral width is equal to or smaller than the threshold value, which indicates that optical signal 102 is a Nyquist/faster-than-Nyquist signal.

In an alternative embodiment, DFT module 320 may be configured to receive a copy of digital signal 222b instead of digital signal 222a. In another alternative embodiment, DFT module 320 may be configured to receive copies of both digital signals 222a and 222b, and to generate spectral samples 322, e.g., based on a sum or some other combination of the received digital signals.

Switch-control signal 326 operates to control the configuration of switches 340a and 340b. More specifically, when switch-control signal 326 has the first binary value, each of switches 340a and 340b adopts a first configuration. When switch-control signal 326 has the second binary value, each of switches 340a and 340b adopts a second configuration.

In the first configuration, switch 340a causes a DFT module 350a to receive a copy of digital signal 222a. In the second configuration, switch 340a causes DFT module 350a to receive a digital signal 336a that is generated by a squaring module 334a based on digital signal 222a. Similarly, in the first configuration, switch 340b causes a DFT module 350b to receive a copy of digital signal 222b. In the second configuration, switch 340b causes DFT module 350b to receive a digital signal 336b that is generated by a squaring module 334b based on digital signal 222b.

As already indicated above, each of digital signals 222a and 222b is a complex-valued digital signal. In an example embodiment, squaring modules 334a and 334b are configured to generate digital signals 336a and 336b based on Eqs. (1a) and (1b), respectively:

$$A_x[k]=X[k]X^*[k] \quad (1a)$$

$$A_y[k]=Y[k]Y^*[k] \quad (1b)$$

where $A_x[k]$ is the value of digital signal 336a in the k-th time slot; $A_y[k]$ is the value of digital signal 336b in the k-th time slot; $X[k]$ is the value of digital signal 222a in the k-th time slot; $Y[k]$ is the value of digital signal 222b in the k-th time slot; and the "*" sign denotes the complex conjugate.

DFT module 350a is configured to apply a Fourier transform to a sequence of digital samples carried by a digital signal 344a to generate a corresponding plurality of spectral samples 354a. Depending on the configuration of switch 340a, digital signal 344a may carry a sequence of $X[k]$ or a sequence of $A_x[k]$. While digital signal 344a may be complex-valued or real-valued (because $X[k]$ are complex-valued whereas $A_x[k]$ are real-valued), spectral samples 354a are generally complex-valued. This is true due to the general properties of the Fourier transform performed by DFT module 350a, which are apparent from Eq. (2):

$$F(\omega)=\int S(t)\exp(-j\omega t)dt \quad (2)$$

where $F(\omega)$ is the Fourier-transformed function; $S(t)$ is the corresponding time-domain function; $\omega$ is angular frequency; and t is time. One of ordinary skill in the art will understand that DFT module 350a is configured to implement a discrete version of the Fourier transform defined by Eq. (2).

DFT module 350b is similarly configured to apply a Fourier transform to a sequence of digital samples carried by a digital signal 344b to generate a corresponding plurality of spectral samples 354b. Depending on the configuration of switch 340b, digital signal 344b may carry a sequence of $Y[k]$ or a sequence of $A_y[k]$. Similar to spectral samples 354a, spectral samples 354b are also generally complex-valued because the properties of the Fourier transform represented by Eq. (2) apply to the discrete Fourier transform performed by DFT module 350b as well.

A spectral-domain combiner 360 operates to generate a complex-valued digital signal 364 by combining the spectral samples 354a and 354b received from DFT modules 350a and 350b. In an example embodiment, spectral-domain combiner 360 is configured to combine spectral samples 354a and 354b in accordance with Eq. (3):

$$Z=C_{XX}C_{YY}-C_{XY}C_{YX} \quad (3)$$

where Z is a complex value carried by digital signal 364, and $C_{XX}$, $C_{YY}$, $C_{XY}$, and $C_{YX}$ are the complex values calculated by spectral-domain combiner 360 in accordance with Eqs. (4a)-(4d):

$$C_{XX} = \sum_{m=1}^{M}\left(\sum_{n=1}^{N} F_X(f_n)F_X^*\left(f_n+\frac{1}{T}\right)\right)_m \quad (4a)$$

$$C_{YY} = \sum_{m=1}^{M}\left(\sum_{n=1}^{N} F_Y(f_n)F_Y^*\left(f_n+\frac{1}{T}\right)\right)_m \quad (4b)$$

$$C_{XY} = \sum_{m=1}^{M}\left(\sum_{n=1}^{N} F_X(f_n)F_Y^*\left(f_n+\frac{1}{T}\right)\right)_m \quad (4c)$$

$$C_{YX} = \sum_{m=1}^{M}\left(\sum_{n=1}^{N} F_Y(f_n)F_X^*\left(f_n+\frac{1}{T}\right)\right)_m \quad (4d)$$

where $F_X(f)$ is a spectral sample corresponding to frequency f in a corresponding set of spectral samples 354a; $F_Y(f)$ is a spectral sample corresponding to frequency f in a corresponding set of spectral samples 354b; T is the symbol period; N is the number of samples in a sequence of spectral samples from digital signals 344a and 344b subjected to a discrete Fourier transform in DFT modules 350a and 350b, respectively; M is the number of Fourier transforms over which the value of Z is being calculated; m and n are indices; and the "*" sign denotes the complex conjugate.

A phase-error estimator 370 is configured to generate phase-error signal 376 by determining the argument of each complex value Z (see Eq. (3)) supplied to it, via digital signal 364, by spectral-domain combiner 360. As already indicated above, interpolators 316a and 316b then operate to resample digital signals 222a and 222b, respectively, to generate the corresponding interpolated signal samples for digital signals 238a and 238b, respectively, corresponding to the clock phases determined based on phase-error signal 376.

Figure 4:
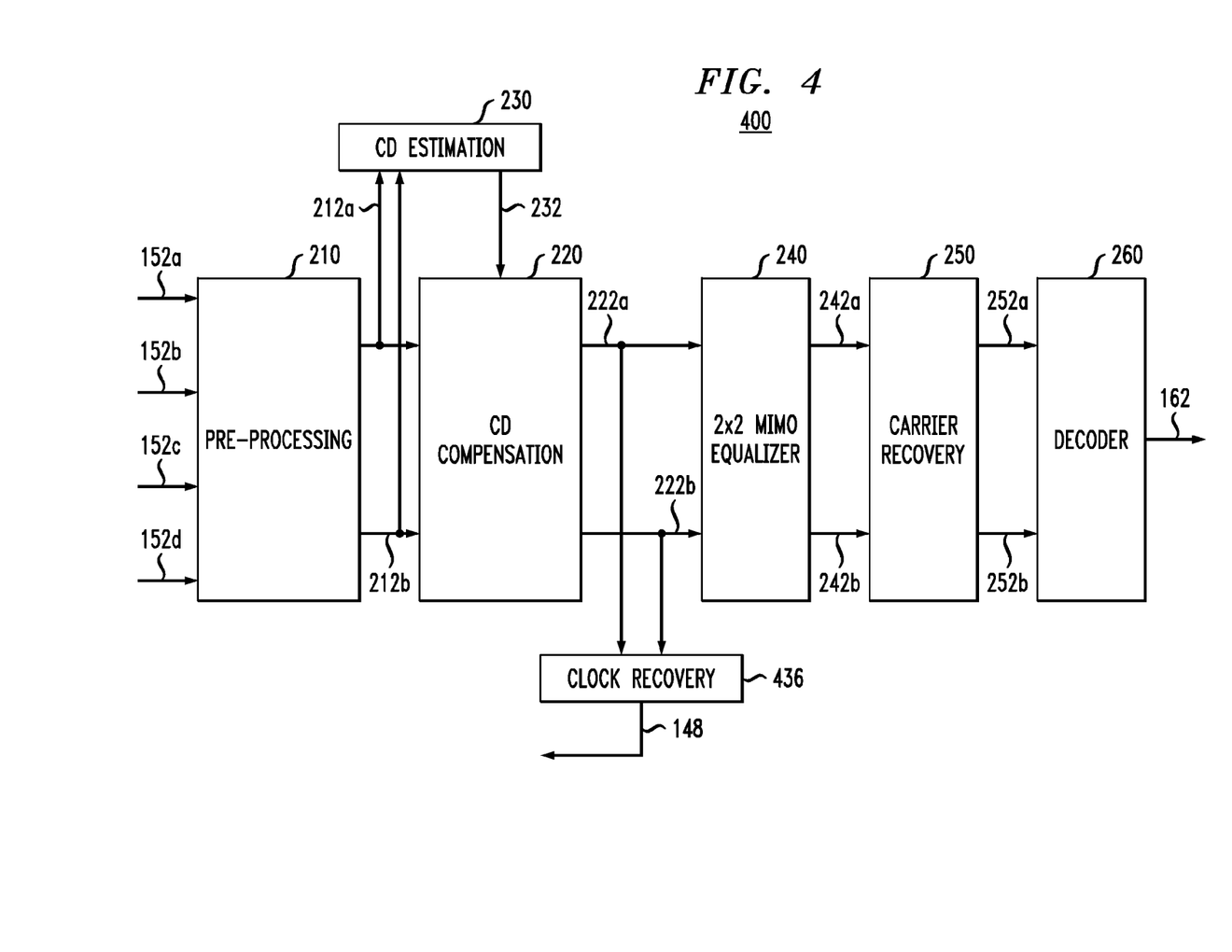
FIG. 4 shows a block diagram of a digital circuit that can be used in the optical receiver of FIG. 1 according to an alternative embodiment of the disclosure.

FIG. 4 shows a block diagram of a digital circuit 400 that can be used in DSP 160 (FIG. 1) according to an alternative embodiment of the disclosure. Digital circuit 400 is functionally similar to digital circuit 200 (FIG. 2), and is constructed using many of the same circuit modules. The nominally identical circuit modules are designated using the same reference labels in both FIGS. 2 and 4. For the description of these circuit modules, the reader is referred to the description of FIG. 2 above. The description of digital circuit 400 focuses primarily on the differences between digital circuits 200 and 400.

One difference between digital circuits 200 and 400 is that the latter circuit has a clock-recovery module 436 instead of clock-recovery module 236. Instead of re-sampling digital signals 222a and 222b (e.g., using interpolators similar to interpolators 316a and 316b; FIG. 3), clock-recovery module 436 is configured to generate control signal 148 for ADCs 150a-150d (see FIG. 1) in a manner that causes the signal sampling performed by the ADCs to be phase-locked to the internal clock of optical signal 102. In contrast, digital circuit 200 is intended for use with control signal 148 that is not phase-locked to the internal clock of optical signal 102, but rather, has a frequency that is two times higher than the nominal symbol rate of that optical signal. An example embodiment of clock-recovery module 436 is described in more detail below in reference to FIG. 5.

Figure 5:
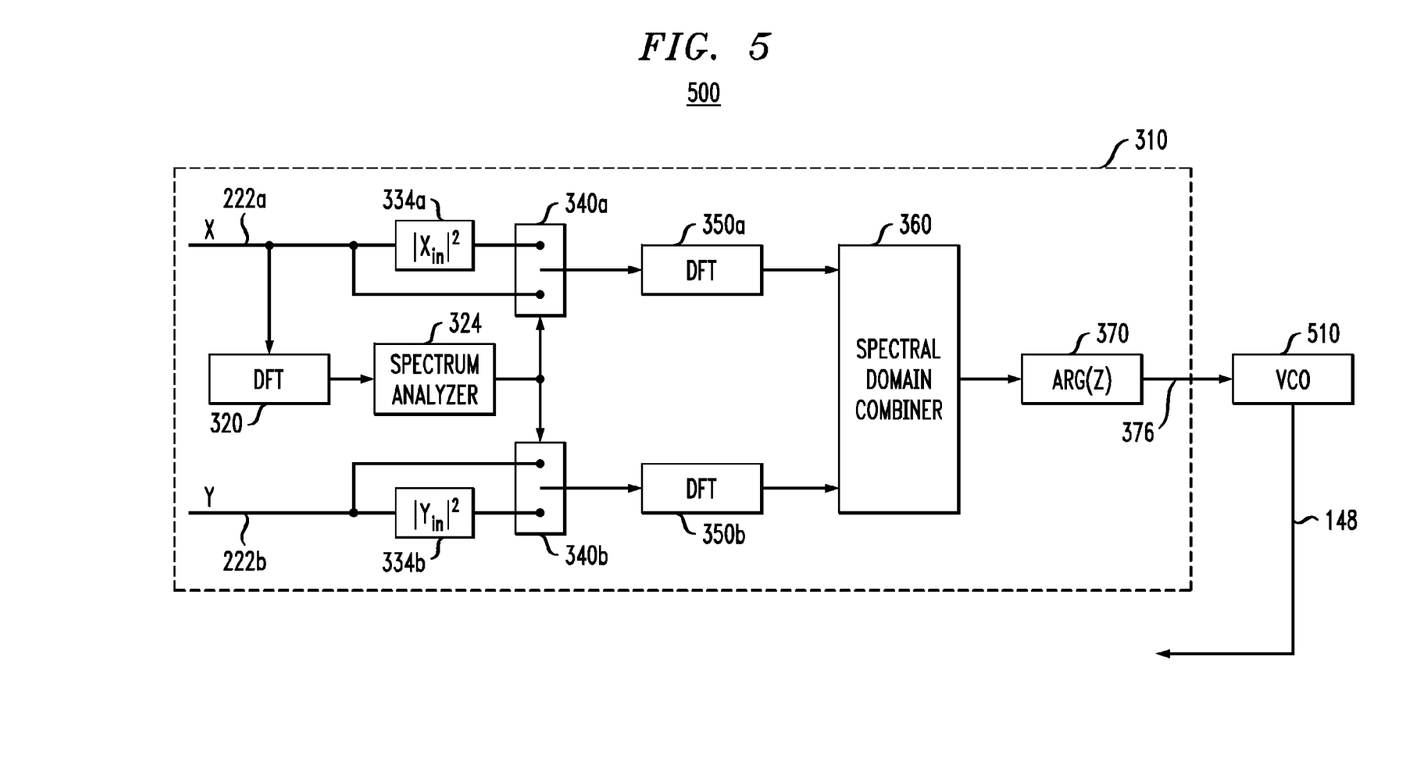
FIG. 5 shows a block diagram of a clock-recovery module that can be used in the digital circuit of FIG. 4 according to an embodiment of the disclosure.

FIG. 5 shows a block diagram of a digital circuit 500 that can be used as clock-recovery module 436 (FIG. 4) according to an embodiment of the disclosure. Digital circuit 500 comprises a copy of phase detector 310 and a voltage-controlled oscillator (VCO) 510. Phase-error signal 376 generated by phase detector 310, e.g., as described above in reference to FIG. 3, is used in digital circuit 500, as known in the art, to configure VCO 510 in a manner that causes the output signal 148 generated by the VCO to be phase-locked to the internal clock of optical signal 102. Output signal 148 generated in this manner is then used to trigger ADCs 150a-150d, thereby causing the signal processing implemented in digital circuit 400 (FIG. 4) to be properly synchronized with the internal clock of optical signal 102.

FIGS. 6A-6D graphically illustrate the performance of phase detector 310 (FIG. 3 or 5) according to an embodiment of the disclosure. More specifically, each of the traces shown in FIGS. 6A-6D graphically shows phase-error signal 376 generated by phase detector 310 under a different respective set of operating conditions, as further detailed below. In all four sets of operating conditions, the modulated optical signal generated by the remote optical transmitter is a polarization-division-multiplexed (PDM) quadrature-phase-shift-keying (QPSK) signal having a bit rate of 112 Gb/s and the symbol rate of 28 GHz. The internal clock of optical receiver 100 has a clock rate that is about 300 kHz lower than the internal clock of the remote optical transmitter. Phase detector 310 is configured to limit the range of phase-error signal 376 to the interval of $[-\pi, \pi]$ radian. One of ordinary skill in the art will understand that this limited phase range does not adversely affect the operation of optical receiver 100.

Figure 6A:
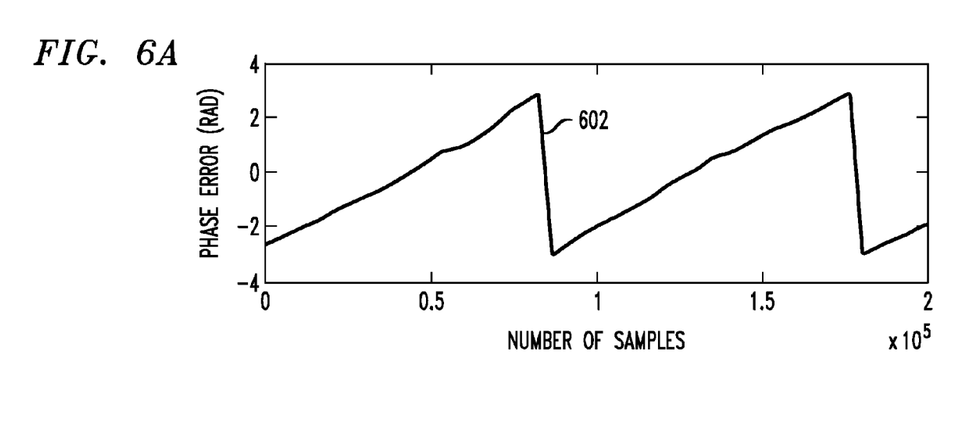
FIGS. 6A-6D graphically illustrate the performance of a phase detector used in clock-recovery modules of FIGS. 3 and 5 according to an embodiment of the disclosure.

FIG. 6A graphically shows phase-error signal 376 when (i) the received optical signal 102 is generated by subjecting the modulated optical signal generated by the remote transmitter to band-pass filtering in an optical filter having a full bandwidth of about 32 GHz; and (ii) phase detector 310 is in the first configuration, which causes digital signals 222a and 222b to bypass squaring modules 334a and 334b, respectively. Under these conditions, the received optical signal 102 is a non-Nyquist signal. A signal trace 602 shown in FIG. 6A indicates that phase-error signal 376 tracks the phase error relatively accurately. One of ordinary skill in the art will understand that the saw-tooth shape of signal trace 602 is due to the limited $[-\pi, \pi]$ range of phase-error values generated by phase detector 310.

Figure 6B:
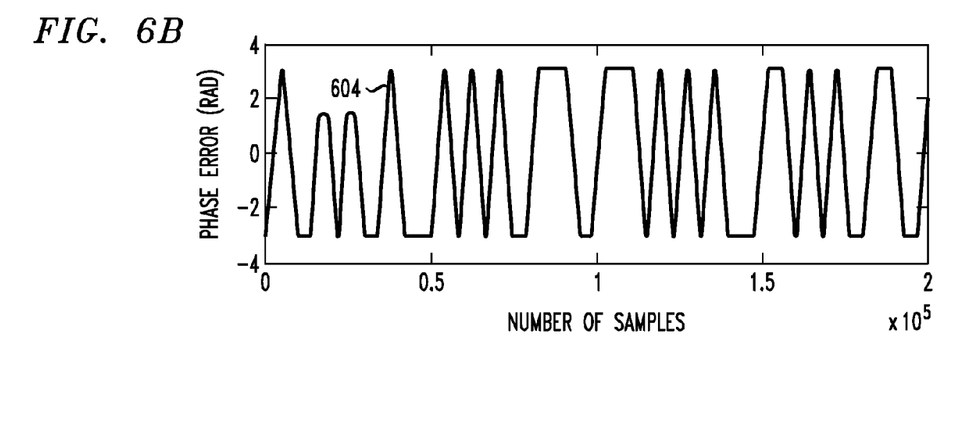

FIG. 6B graphically shows phase-error signal 376 when (i) the received optical signal 102 is generated by subjecting the modulated optical signal generated by the remote transmitter to band-pass filtering in an optical filter having a full bandwidth of about 20 GHz; and (ii) phase detector 310 is in the first configuration, which causes digital signals 222a and 222b to bypass squaring modules 334a and 334b, respectively. Under these conditions, the received optical signal 102 is a faster-than-Nyquist signal. A signal trace 604 shown in FIG. 6B indicates that phase-error signal 376 tracks the phase error relatively poorly, which is due to a substantial breakdown of the phase-error-tracking algorithm corresponding to the first configuration under these conditions.

Figure 6C:
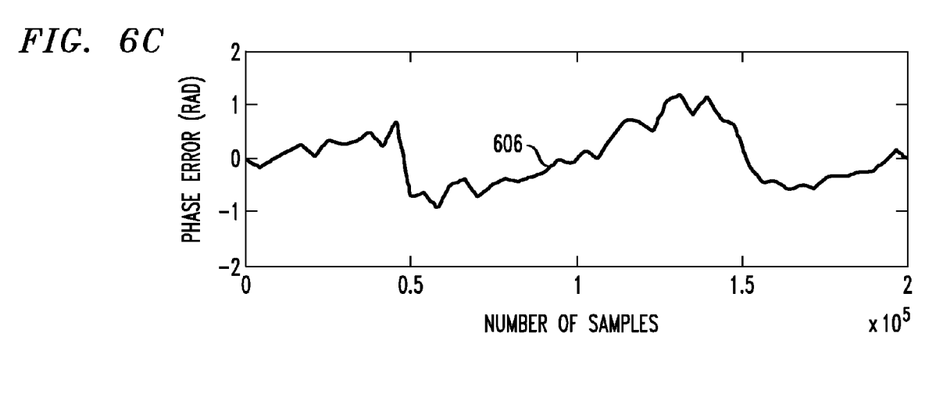

FIG. 6C graphically shows phase-error signal 376 when (i) the received optical signal 102 is generated by subjecting the modulated optical signal generated by the remote transmitter to band-pass filtering in an optical filter having a full bandwidth of about 32 GHz; and (ii) phase detector 310 is in the second configuration, which causes digital signals 222a and 222b to go through squaring modules 334a and 334b, respectively. Under these conditions, the received optical signal 102 is a non-Nyquist signal. A signal trace 606 shown in FIG. 6C indicates that phase-error signal 376 tracks the phase error relatively poorly, which is due to the relatively poor performance of the phase-error-tracking algorithm corresponding to the second configuration under these conditions.

Figure 6D:
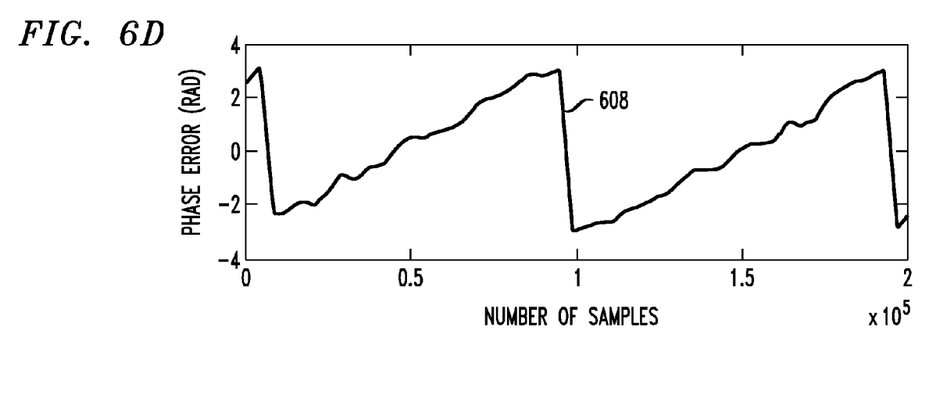

FIG. 6D graphically shows phase-error signal 376 when (i) the received optical signal 102 is generated by subjecting the modulated optical signal generated by the remote transmitter to band-pass filtering in an optical filter having a full bandwidth of about 20 GHz; and (ii) phase detector 310 is in the second configuration, which causes digital signals 222a and 222b to go through squaring modules 334a and 334b, respectively. Under these conditions, the received optical signal 102 is a faster-than-Nyquist signal. A signal trace 608 shown in FIG. 6D indicates that phase-error signal 376 tracks the phase error relatively accurately, with an accuracy approaching that of signal trace 602 (FIG. 6A).

As indicated above, spectrum analyzer 324 generates control signal 326 in a manner that causes phase detector 310 to adopt the first configuration for non-Nyquist signals and the second configuration for faster-than-Nyquist signals. As a result, phase-error signal 376 generated by phase detector 310 may advantageously be similar to signal trace 602 or signal trace 608. Thus, the relatively inaccurate phase-error tracking illustrated by signal traces 604 and 606 may advantageously be avoided.

According to an example embodiment disclosed above in reference to FIGS. 1-6, provided is an apparatus (e.g., 100, FIG. 1) comprising: an optical-to-electrical converter (e.g., 120+140+150, FIG. 1) configured to mix an optical input signal (e.g., 102, FIG. 1) with an optical reference signal (e.g., 112, FIG. 1) to generate a plurality of electrical digital measures (e.g., 152a-152d, FIG. 1) of the optical input signal; and a digital circuit (e.g., 160, FIG. 1; 200, FIG. 2; 400, FIG. 4) configured to process the plurality of electrical digital measures to recover data (e.g., 162, FIGS. 1, 2, 4) encoded in the optical input signal. The digital circuit comprises a configurable clock-recovery module (e.g., 236, FIG. 2; 300, FIG. 3; 436, FIG. 4; 500, FIG. 5), an operative configuration of which is selectable, based on a bandwidth of the optical input signal, from a first configuration and a second configuration. The digital circuit is configured to recover the data using a clock signal (e.g., 376, FIG. 3; 148, FIG. 5) generated by the clock-recovery module in the operative configuration.

In some embodiments of the above apparatus, the apparatus further comprises an optical transport link configured to apply the optical input signal to the optical-to-electrical converter, wherein the optical transport link is configured to cause the bandwidth of the optical input signal to vary over time.

In some embodiments of any of the above apparatus, the configurable clock-recovery module comprises a configuration controller (e.g., 320+324, FIG. 3 or 5) configured to estimate the bandwidth of the optical input signal by determining a bandwidth of an electrical digital signal generated by the digital circuit using the plurality of electrical digital measures.

In some embodiments of any of the above apparatus, the configuration controller is further configured to: compare the bandwidth of the electrical digital signal with a threshold value; configure the configurable clock-recovery module to operate in the first configuration when the bandwidth of the electrical digital signal is greater than the threshold value; and configure the configurable clock-recovery module to operate in the second configuration when the bandwidth of the electrical digital signal is smaller than the threshold value.

In some embodiments of any of the above apparatus, the threshold value is approximately (e.g., within ±20% of) 1/T, where T is a symbol period of the optical input signal.

In some embodiments of any of the above apparatus, the configuration controller comprises: a Fourier transform module (e.g., 320, FIG. 3 or 5) configured to generate a plurality of spectral samples (e.g., 322, FIG. 3) by applying a Fourier transform to the electrical digital signal; and a spectrum analyzer (e.g., 324, FIG. 3 or 5) configured to determine the bandwidth of the electrical digital signal by analyzing a spectral envelope defined by the plurality of spectral samples.

In some embodiments of any of the above apparatus, the digital circuit is configured to generate the electrical digital signal in a manner that causes the electrical digital signal to consist of signal samples corresponding to a single (e.g., X, FIG. 3 or 5) polarization of the optical input signal.

In some embodiments of any of the above apparatus, the configurable clock-recovery module comprises: a first squaring module (e.g., 334a, FIG. 3 or 5) configured to generate a squared absolute value of each received signal sample corresponding to a first polarization (e.g., X, FIG. 3 or 5) of the optical input signal; and a first switch (e.g., 340a, FIG. 3 or 5) coupled to the first squaring module and configured to: route, in the first configuration, the received signal samples corresponding to the first polarization to bypass the first squaring module; and route, in the second configuration, the received signal samples corresponding to the first polarization to go through the first squaring module, wherein the received signal samples corresponding to the first polarization are transformed into corresponding first squared absolute values. The clock-recovery module is configured to generate the clock signal based on the received signal samples corresponding to the first polarization and routed by the first switch.

In some embodiments of any of the above apparatus, the configurable clock-recovery module further comprises: a second squaring module (e.g., 334b, FIG. 3 or 5) configured to generate a squared absolute value of each received signal sample corresponding to a second polarization (e.g., Y, FIG. 3 or 5) of the optical input signal; and a second switch (e.g., 340b, FIG. 3 or 5) coupled to the second squaring module and configured to: route, in the first configuration, the received signal samples corresponding to the second polarization to bypass the second squaring module; and route, in the second configuration, the received signal samples corresponding to the second polarization to go through the second squaring module, wherein the received signal samples corresponding to the second polarization are transformed into corresponding second squared absolute values.

In some embodiments of any of the above apparatus, the clock-recovery module is further configured to generate the clock signal based on the received signal samples corresponding to the second polarization and routed by the second switch.

In some embodiments of any of the above apparatus, the configurable clock-recovery module further comprises: a first Fourier transform module (e.g., 350a, FIG. 3 or 5) configured to generate a first plurality of spectral samples (e.g., 354a, FIG. 3) by applying a Fourier transform to the received signal samples corresponding to the first polarization or the corresponding first squared absolute values; a second Fourier transform module (e.g., 350b, FIG. 3 or 5) configured to generate a second plurality of spectral samples (e.g., 354b, FIG. 3) by applying a Fourier transform to the received signal samples corresponding to the second polarization or the corresponding second squared absolute values; and a spectral-domain combiner (e.g., 360, FIG. 3 or 5) configured to combine the first plurality of spectral samples and the second plurality of spectral samples to generate a digital complex measure (e.g., Z, FIG. 3) of a desired phase of the clock signal. The clock-recovery module is further configured to generate the clock signal based on the digital complex measure.

In some embodiments of any of the above apparatus, the configurable clock-recovery module further comprises a phase-error estimator (e.g., 370, FIG. 3 or 5) configured to determine the desired phase of the clock signal by determining an argument of the digital complex measure.

In some embodiments of any of the above apparatus, the configurable clock-recovery module further comprises a voltage-controlled oscillator (e.g., 510, FIG. 5) configured to generate the clock signal (e.g., 148, FIGS. 1 and 5) in a manner that causes the clock signal to have the desired phase.

In some embodiments of any of the above apparatus, the configurable clock-recovery module comprises: a first interpolator (e.g., 316a, FIG. 3) configured to generate a stream of first signal samples (e.g., 238a, FIG. 3) by (i) interpolating a first electrical digital signal (e.g., 222a, FIG. 3) corresponding to a first polarization (e.g., X, FIG. 3) of the optical input signal and generated by the digital circuit using the plurality of electrical digital measures and (ii) sampling a resulting first interpolated digital signal at times defined by the clock signal; and a second interpolator (e.g., 316b, FIG. 3) configured to generate a stream of second signal samples (e.g., 238b, FIG. 3) by (i) interpolating a second electrical digital signal (e.g., 222b, FIG. 3) corresponding to a second polarization (e.g., Y, FIG. 3) of the optical input signal and generated by the digital circuit using the plurality of electrical digital measures and (ii) sampling a resulting second interpolated digital signal at the times defined by the clock signal. The digital circuit is configured to recover the data using the stream of first signal samples and the stream of second signal samples.

In some embodiments of any of the above apparatus, the digital circuit further comprises a chromatic-dispersion-compensation module (e.g., 220, FIG. 2) configured to generate the first electrical digital signal and the second electrical digital signal by reducing effects of chromatic dispersion in the plurality of electrical digital measures.

In some embodiments of any of the above apparatus, the digital circuit further comprises a 2×2 MIMO equalizer (e.g.,

240, FIG. 2) and configured to perform polarization demultiplexing on the resulting first interpolated digital signal and the resulting second interpolated digital signal.

In some embodiments of any of the above apparatus, the optical-to-electrical converter comprises a plurality of analog-to-digital converters (e.g., 150, FIG. 1) configured to generate the plurality of electrical digital measures of the optical input signal by sampling, at times defined by the clock signal, electrical analog signals (e.g., 138a-138d, FIG. 1) generated by the optical-to-electrical converter by mixing the optical input signal with the optical reference signal.

According to another example embodiment disclosed above in reference to FIGS. 1-6, provided is a method of processing an optical input signal, the method comprising the steps of: optically mixing the optical input signal (e.g., 102, FIG. 1) with an optical reference signal (e.g., 112, FIG. 1) to generate a plurality of electrical digital measures (e.g., 152a-152d, FIG. 1) of the optical input signal; estimating a bandwidth of the optical input signal by determining a bandwidth of an electrical digital signal (e.g., 222a, FIG. 3) generated by digitally processing the plurality of electrical digital measures; generating a clock signal (e.g., 376, FIG. 3; 148, FIG. 5) using a configurable clock-recovery module (e.g., 236, FIG. 2; 300, FIG. 3; 436, FIG. 4; 500, FIG. 5), an operative configuration of which is selectable, based on the bandwidth of the optical input signal, from a first configuration and a second configuration; and recovering data (e.g., 162, FIGS. 1, 2, 4) encoded in the optical input signal using the clock signal generated by the clock-recovery module in the operative configuration.

In some embodiments of the above method, the method further comprises: comparing the bandwidth of the electrical digital signal with a threshold value; configuring the configurable clock-recovery module to operate in the first configuration when the bandwidth of the electrical digital signal is greater than the threshold value; and configuring the configurable clock-recovery module to operate in the second configuration when the bandwidth of the electrical digital signal is smaller than the threshold value.

In some embodiments of any of the above methods, the threshold value is approximately (e.g., within ±20% of) 1/T, where T is a symbol period of the optical input signal.

In some embodiments of any of the above methods, the step of generating comprises: generating, in the second configuration, a squared absolute value of each signal sample carried by the electrical digital signal using a squaring module (e.g., 334a, FIG. 3); and routing, in the first configuration, the electrical digital signal in a manner that causes the electrical digital signal to bypass the squaring module.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An apparatus comprising:
an optical-to-electrical converter configured to mix an optical input signal with an optical reference signal to generate a plurality of electrical digital measures of the optical input signal; and
a digital circuit configured to process the plurality of electrical digital measures to recover data encoded in the optical input signal;
wherein the digital circuit comprises a clock-recovery module configured to generate a clock signal in a manner that depends on whether a bandwidth of the optical input signal is greater or smaller than a threshold value;
wherein the digital circuit is configured to recover the data using the clock signal generated by the clock-recovery module; and
wherein the clock-recovery module comprises:
a first signal-processing path configured to bypass a squaring module;
a second signal-processing path that includes the squaring module, the squaring module being configured to generate a squared absolute value of each signal sample applied thereto by the second signal-processing path;
a spectrum analyzer configured to:
determine the bandwidth of the optical input signal by analyzing a spectral envelope corresponding to the plurality of electrical digital measures;
cause the clock-recovery module to generate the clock signal using the first signal-processing path if the bandwidth of the optical input signal is determined to be greater than the threshold value; and
cause the clock-recovery module to generate the clock signal using the second signal-processing path if the bandwidth of the optical input signal is determined to be smaller than the threshold value.

2. The apparatus of claim 1, further comprising an optical transport link configured to apply the optical input signal to the optical-to-electrical converter, wherein the optical transport link is configured to cause the bandwidth of the optical input signal to vary over time.

3. The apparatus of claim 1,
wherein the clock recovery module further comprises a switch; and
wherein the spectrum analyzer is further configured to:
compare the bandwidth with the threshold value;
cause the switch to engage the first signal-processing path and disengage the second signal-processing path if the bandwidth of the optical input signal is greater than the threshold value; and
cause the switch to disengage the first signal-processing path and engage the second signal-processing path if the bandwidth of the optical input signal is smaller than the threshold value.

4. The apparatus of claim 1, wherein the threshold value is approximately 1/T, where T is a symbol period of the optical input signal.

5. The apparatus of claim 1, wherein the clock-recovery module further comprises
a Fourier transform module configured to generate a plurality of spectral samples representing the spectral envelope by applying a Fourier transform to an electrical digital signal generated by the digital circuit in response to receiving the plurality of electrical digital measures from the optical-to-electrical converter.

6. The apparatus of claim 5, wherein the digital circuit is configured to generate the electrical digital signal in a manner that causes the electrical digital signal to consist of signal samples corresponding to a single polarization of the optical input signal.

7. The apparatus of claim 1, wherein the clock-recovery module further comprises a phase-error estimator coupled to the first and second signal-processing paths and configured to cause the clock signal to have a desired phase.

8. The apparatus of claim 7, wherein the clock-recovery module further comprises a voltage-controlled oscillator configured to generate the clock signal having the desired phase in response to a phase-error signal received from the phase-error estimator.

9. The apparatus of claim 1,
wherein the clock-recovery module comprises:
a first interpolator configured to generate a stream of first signal samples by (i) interpolating a first electrical digital signal corresponding to a first polarization of the optical input signal and generated by the digital circuit using the plurality of electrical digital measures and (ii) sampling a resulting first interpolated digital signal at times defined by the clock signal; and
a second interpolator configured to generate a stream of second signal samples by (i) interpolating a second electrical digital signal corresponding to a second polarization of the optical input signal and generated by the digital circuit using the plurality of electrical digital measures and (ii) sampling a resulting second interpolated digital signal at the times defined by the clock signal; and
wherein the digital circuit is configured to recover the data using the stream of first signal samples and the stream of second signal samples.

10. The apparatus of claim 9, wherein the digital circuit further comprises a chromatic-dispersion-compensation module configured to generate the first electrical digital signal and the second electrical digital signal by reducing effects of chromatic dispersion in the plurality of electrical digital measures.

11. The apparatus of claim 10, wherein the digital circuit further comprises a 2×2 MIMO equalizer and configured to perform polarization demultiplexing on the resulting first interpolated digital signal and the resulting second interpolated digital signal.

12. The apparatus of claim 1, wherein the optical-to-electrical converter comprises a plurality of analog-to-digital converters configured to generate the plurality of electrical digital measures of the optical input signal by sampling, at times defined by the clock signal, electrical analog signals generated by the optical-to-electrical converter by mixing the optical input signal with the optical reference signal.

13. A method of processing an optical input signal, the method comprising:
optically mixing the optical input signal with an optical reference signal to generate a plurality of electrical digital measures of the optical input signal;

determining a bandwidth of the optical input signal by analyzing a spectral envelope corresponding to the plurality of electrical digital measures using a spectrum analyzer;

generating a clock signal in a manner that depends on whether the bandwidth of the optical input signal is greater or smaller than a threshold value; and recovering data encoded in the optical input signal using the clock signal; and wherein the step of generating comprises:

generating the clock signal using a first signal-processing path of a clock-recovery module if the bandwidth of the optical input signal is determined to be greater than the threshold value, the first signal-processing path configured to bypass a squaring module; and generating the clock signal using a second signal-processing path of the clock-recovery module if the bandwidth of the optical input signal is determined to be smaller than the threshold value, the second signal-processing path including the squaring module, the squaring module being configured to generate a squared absolute value of each signal sample applied thereto by the second signal-processing path.

14. The method of claim 13, wherein the threshold value is approximately 1/T, where T is a symbol period of the optical input signal.

* * * * *